(12) United States Patent
Kellner et al.

(10) Patent No.: US 11,670,817 B2
(45) Date of Patent: Jun. 6, 2023

(54) ENERGY STORAGE ARRANGEMENT FOR A MOTOR VEHICLE AND MOTOR VEHICLE COMPRISING SUCH AN ENERGY STORAGE ARRANGEMENT

(71) Applicant: Dr. Ing. h.c. F. Porsche Aktiengesellschaft, Stuttgart (DE)

(72) Inventors: Philipp Kellner, Rennigen (DE); Jens Bohlien, Stuttgart (DE); Christopher Volkmer, Niefern-Öschelbronn (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 232 days.

(21) Appl. No.: 17/068,981

(22) Filed: Oct. 13, 2020

(65) Prior Publication Data
US 2021/0111386 A1   Apr. 15, 2021

(30) Foreign Application Priority Data

Oct. 14, 2019 (DE) ..................... 10 2019 127 588.1

(51) Int. Cl.
*H01M 50/204* (2021.01)
*B60L 50/64* (2019.01)
*H01M 50/249* (2021.01)
*H01M 50/242* (2021.01)
*B60K 6/28* (2007.10)

(52) U.S. Cl.
CPC ........... *H01M 50/204* (2021.01); *B60L 50/64* (2019.02); *H01M 50/242* (2021.01); *H01M 50/249* (2021.01); *B60K 6/28* (2013.01); *B60Y 2200/91* (2013.01); *B60Y 2200/92* (2013.01); *B60Y 2400/112* (2013.01); *H01M 2220/20* (2013.01)

(58) Field of Classification Search
None
See application file for complete search history.

(56) References Cited

U.S. PATENT DOCUMENTS

| 2018/0102576 A1* | 4/2018 | Yamamoto ........... H01M 50/20 |
| 2018/0215282 A1 | 8/2018 | Pohl et al. |
| 2020/0161717 A1 | 5/2020 | Fritz et al. |
| 2020/0198453 A1 | 6/2020 | Hilfrich et al. |

FOREIGN PATENT DOCUMENTS

| CN | 110176566 A | 8/2019 | |
| DE | 102010024320 A1 * | 12/2011 | ............... B60K 1/04 |
| DE | 102016125697 A1 | 6/2018 | |
| DE | 102017103653 A1 | 8/2018 | |
| DE | 102017215315 A1 | 3/2019 | |
| DE | 102018129158 A1 | 5/2020 | |
| WO | 2018149762 A1 | 8/2018 | |

* cited by examiner

*Primary Examiner* — Gregg Cantelmo
(74) *Attorney, Agent, or Firm* — RatnerPrestia

(57) ABSTRACT

An energy storage arrangement for a motor vehicle, including a protective device which can be arranged above a ground clearance line of the motor vehicle, and at least one battery module which is arranged above the protective device and which has at least one load-bearing battery module housing and at least one battery cell pack arranged in the interior of the battery module housing. The battery module housing includes at least two vertically arranged housing walls. The protective device has a protective plate and at least two load introduction elements arranged above the protective plate. The load introduction elements are arranged below the housing walls.

12 Claims, 2 Drawing Sheets

ENERGY STORAGE ARRANGEMENT FOR A MOTOR VEHICLE AND MOTOR VEHICLE COMPRISING SUCH AN ENERGY STORAGE ARRANGEMENT

CROSS-REFERENCE TO RELATED APPLICATION

This application claims priority to German Patent Application No. 10 2019 127 588.1, filed Oct. 14, 2019, the content of such application being incorporated by reference herein in its entirety.

FIELD OF THE INVENTION

The invention relates to an energy storage arrangement, in particular a high-voltage energy storage arrangement for a motor vehicle, in particular for an electric vehicle and/or hybrid vehicle, and to a motor vehicle, in particular an electric vehicle and/or hybrid vehicle, comprising such an energy storage arrangement.

BACKGROUND OF THE INVENTION

Such energy storage arrangements should generally be protected against mechanical influences. If the energy storage arrangement is arranged in a low position in the motor vehicle, mechanical protection on the underside of the motor vehicle is advantageous.

The energy storage arrangements which are known from the prior art and are in a low position in the motor vehicle are generally protected against mechanical influences by one or more battery protective plates which are positioned between battery modules of the energy storage arrangement and a ground clearance line of the motor vehicle. Additional longitudinal and/or transverse supports are provided between the individual battery modules, the main function of which supports is to absorb loads with a direction of action parallel to the carriageway plane. The protective plates here are sometimes subjected to a bending load under the action of the load. The supports between the battery modules act here as load introduction elements which are suitable for introducing loads from the protective plate into the body. Such an energy storage arrangement is known, for example, from the document WO 2018/149762 A1, which is incorporated by reference herein in its entirety.

Under the assumption of a load acting on the battery protective plate as a result of a deflection at the vehicle chassis and consecutive placing of the battery protective plate onto an object fixed on the carriageway, an increase in the thickness of the protective plate while keeping the overall construction space (protective plate thickness and deformation travel) constant, leads to an increase in the crash energy absorbed by the protective plate and to a reduction in the crash energy dissipated by the road mechanism since an increase in the protective plate thickness reduces the spring travel of the chassis. Therefore, as a rule, the required overall construction space of the battery protective plate can be reduced only insubstantially by an increase in the protective plate thickness.

SUMMARY OF THE INVENTION

Described herein is an energy storage arrangement which is distinguished by a low construction space requirement. Also described herein is an energy storage arrangement having a load-bearing structure, which is distinguished by a shortening of the bending length of the protective plate.

The energy storage arrangement according to aspects of the invention comprises a protective device which can be arranged above a ground clearance line of the motor vehicle, and at least one battery module which is arranged above the protective device and which has at least one load-bearing battery module housing and at least one battery cell pack arranged in the interior of the battery module housing. The battery module housing comprises at least two vertically arranged housing walls. The protective device comprises a protective plate and at least two load introduction elements arranged above the protective plate. The load introduction elements are arranged below the housing walls.

The terms above and below relate to the correct installation position of the energy storage arrangement in the motor vehicle in the vertical direction. The term vertically likewise relates to the correct installation position of the energy storage arrangement in the motor vehicle.

The battery module housing can be in direct contact with the protective device, in particular with the load introduction elements of the protective device. Alternatively, the battery module housing can be connected indirectly to the protective device, for example via a body of the motor vehicle. The load introduction elements can be spaced apart here from the battery module housing by means of an air gap.

If the load introduction elements are not in direct contact with the battery module housing, they are arranged below the vertical housing walls of the battery module housing in such a manner that, in the event of deformation of the protective device caused by a vehicle accident, they come into contact with the battery module housing in the region of the vertical housing walls.

In a preferred refinement, the battery module housing comprises at least three housing walls which can be arranged vertically, wherein at least one of the housing walls is in the form of a partition which divides the battery module housing into at least two chambers, in each of which a battery cell pack is arranged.

In a further preferred refinement, the battery module housing is in the form of an extruded profile. That is to say that the battery module housing is produced by means of extrusion.

In a preferred refinement, the load introduction elements comprise at least one supporting surface which is arranged below one of the housing walls.

The supporting surface preferably runs orthogonally to the housing wall.

In a further preferred refinement, the load introduction elements are substantially wave-shaped and form a corrugated plate.

As an alternative thereto, the load introduction elements are substantially in the form of a top hat profile.

According to a further alternative refinement, the load introduction elements are in the form of domes which are injection molded on the protective plate in an in-situ process.

The invention furthermore relates to a motor vehicle comprising an energy storage arrangement according to aspects of the invention, wherein the protective device of the energy storage arrangement is arranged above a ground clearance line of the motor vehicle, wherein the at least one battery module is arranged above the protective device, and wherein the battery module housing is arranged on the motor vehicle in such a manner that the at least two housing walls of the battery module housing are arranged vertically.

BRIEF DESCRIPTION OF THE DRAWING FIGURES

Details and further advantages of the energy storage arrangement according to aspects of the invention and of the motor vehicle according to aspects of the invention will be explained with reference to three exemplary embodiments described below. In this case:

DETAILED DESCRIPTION OF THE INVENTION

Figure 1:
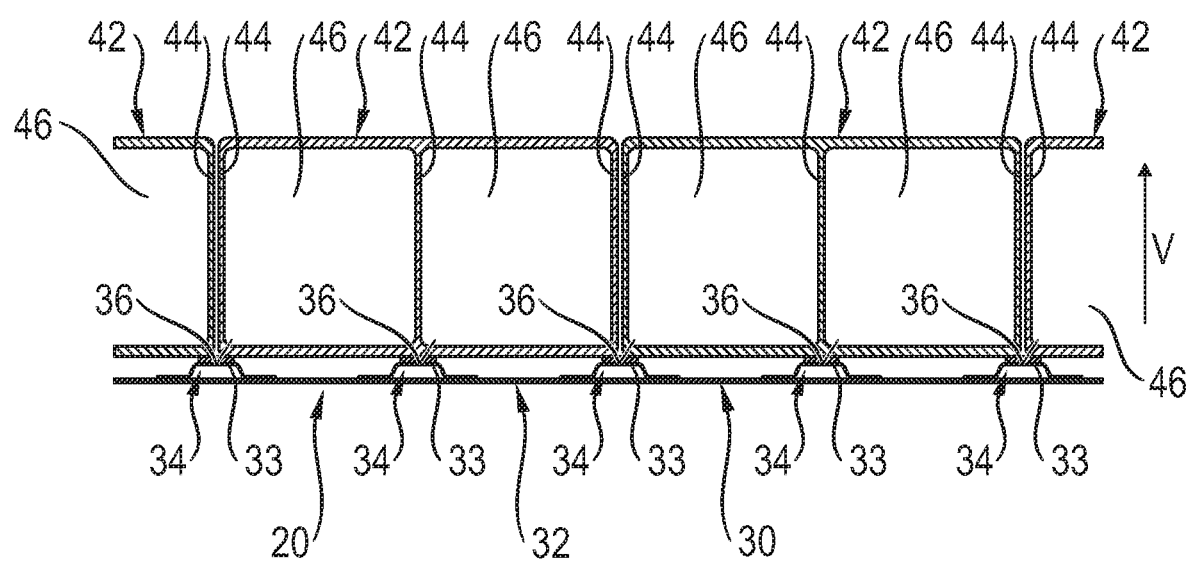
FIG. 1 shows a sectional view of the energy storage arrangement according to the application according to a first exemplary embodiment.

The application relates to an energy storage arrangement 20, in particular a high-voltage energy storage arrangement, and to a motor vehicle, in particular an electric vehicle and/or hybrid vehicle comprising such an energy storage arrangement 20.

Such energy storage arrangements 20 should generally be protected against mechanical influences. If the energy storage arrangement 20 is arranged in a low position in the motor vehicle, mechanical protection on the underside of the motor vehicle is advantageous.

The energy storage arrangements which are known from the prior art and are in a low position in the motor vehicle are generally protected against mechanical influences by one or more battery protective plates which are positioned between battery modules of the energy storage arrangement and a ground clearance line of the motor vehicle. Additional longitudinal and/or transverse supports are provided between the individual battery modules, the main function of which supports is to absorb loads with a direction of action parallel to the carriageway plane. The protective plates here are sometimes subjected to a bending load under the action of the load. The supports between the battery modules act here as load introduction elements which are suitable for introducing loads from the protective plate into the body.

Under the assumption of a load acting on the battery protective plate as a result of a deflection at the vehicle chassis and consecutive placing of the battery protective plate onto an object fixed on the carriageway, an increase in the thickness of the protective plate while keeping the overall construction space (protective plate thickness and deformation travel) constant, leads to an increase in the crash energy absorbed by the protective plate (impact energy) and to a reduction in the crash energy dissipated by the road mechanism since an increase in the protective plate thickness reduces the spring travel of the chassis. Therefore, as a rule, the required overall construction space of the battery protective plate can be reduced only insubstantially by an increase in the protective plate thickness. A reduction in the distance between the supporting points of the protective plate on the battery modules leads to an increase in the load level during the deformation of the protective plate without reducing the deformation travel of the chassis.

The energy storage arrangement 20 according to the application for a motor vehicle comprises a protective device 30 which can be arranged above a ground clearance line of the motor vehicle, and at least one battery module which is arranged above the protective device 30 and which has at least one load-bearing battery module housing 42 and at least one battery cell pack (not illustrated in the figures) arranged in the interior of the battery module housing 42. The battery module housing 42 comprises at least two vertically arranged housing walls 44. The protective device 30 comprises a protective plate 32 and at least two load introduction elements 34 arranged above the protective plate 32. The load introduction elements 34 are arranged below the housing walls 44.

The terms above and below relate to the correct installation position of the energy storage arrangement 20 in the motor vehicle in the vertical direction V. The term vertically likewise relates to the correct installation position of the energy storage arrangement 20 in the motor vehicle.

The battery module housing 42 can be in direct contact with the protective device 30, in particular with the load introduction elements 34 of the protective device 30. Alternatively, the battery module housing 42 can be connected indirectly to the protective device 30, for example via a body of the motor vehicle. The load introduction elements 34 can be spaced apart here from the battery module housing 42 by means of an air gap.

If the load introduction elements 34 are not in direct contact with the battery module housing 42, they are arranged below the vertical housing walls 44 of the battery module housing 42 in such a manner that, in the event of deformation of the protective device 30 caused by a vehicle accident, they come into contact with the battery module housing 42 in the region of the vertical housing walls 44.

The battery module housing 42 can comprise at least three housing walls 44 which can be arranged vertically, wherein at least one of the housing walls 44 can be in the form of a partition which can divide the battery module housing 42 into at least two chambers 46, in each of which a battery cell pack can be arranged. The chambers 46 can be arranged next to one another in a first direction running parallel to the carriageway and extend substantially in a second direction running parallel to the carriageway and orthogonally to the first direction. The partition of the battery module housing 42 forms a further additional load path for the battery module housing 42.

The housing walls 44 can have comparatively high structural rigidity. The battery module housing 42 can be manufactured, for example, from aluminum. The housing walls 44 serve for introducing the load through the protective device 30.

The battery module housing 42 can be in the form of an extruded profile.

The load introduction elements 34 are formed sufficiently stiffly that the load introduction elements 34 are suitable for introducing the load into the battery module housing 42 or into the housing walls 44 of the battery module housing 42.

The protective device 30 can be designed in such a manner that action upon the protective device 30 by means of a force in the direction of the battery cell packs of the energy storage arrangement 20 leads to load being introduced via the protective plate 32 into the load introduction elements 34.

The load introduction elements 34 can comprise at least one supporting surface 36 which is arranged below one of the housing walls 44. The supporting surface 36 can run orthogonally to the housing wall 44, i.e. horizontally with respect to the correct installation position in the motor vehicle.

The supporting surface 36 can either be in direct contact with the battery module housing 42 or can be spaced apart from the battery module housing 42 by means of an air gap. If the supporting surface 36 is spaced apart from the battery module housing 42, the supporting surface 36 comes into contact with the battery module housing 42 in the region of the vertical housing walls 44 in the event of deformation of the protective device 30 caused by a vehicle accident.

Figure 4:
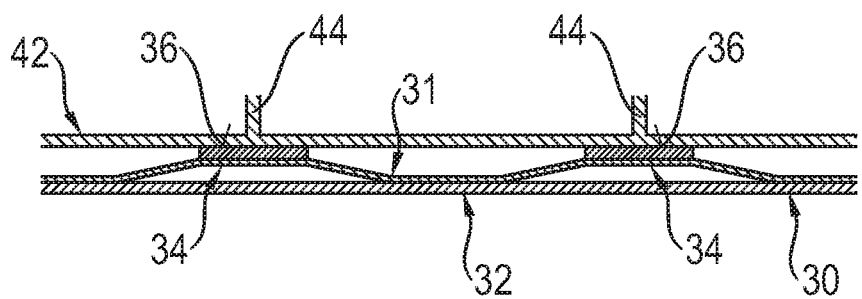
FIG. 4 shows a sectional view of the energy storage arrangement according to the application according to a second exemplary embodiment.
Figure 5:
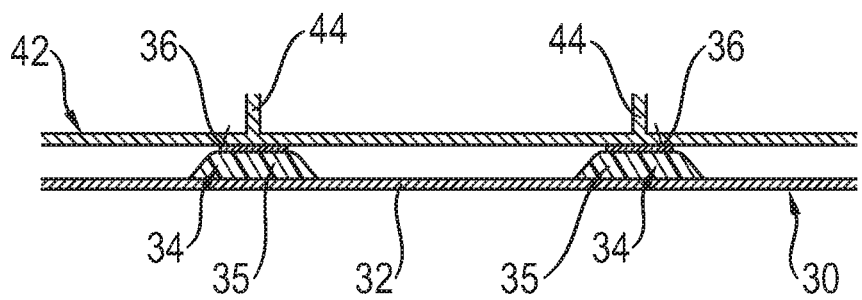
FIG. 5 shows a sectional view of the energy storage arrangement according to the application according to a third exemplary embodiment.

The load introduction elements 34 can be substantially wave-shaped and can form a corrugated plate 31. The load introduction elements 34 of the energy storage arrangement 20 according to the second exemplary embodiment are thus wave-shaped in this manner. This is reproduced in particular in FIG. 4.

Alternatively, the load introduction elements 34 can be in the form of a top hat profile 33 or in the form of domes 35 which are injection molded on the protective plate 32 in an in-situ process.

Figure 2:
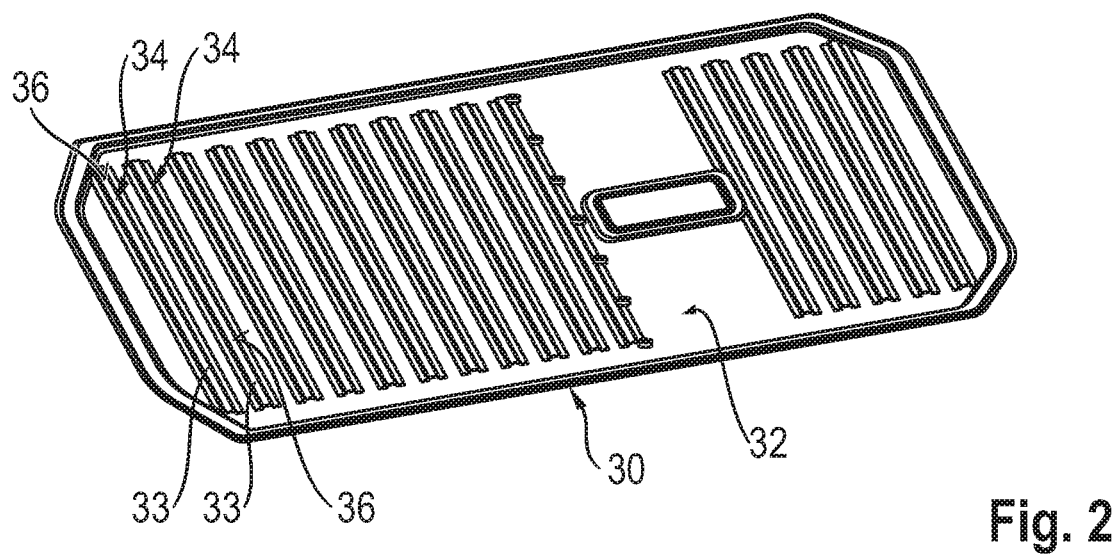
FIG. 2 shows a perspective view of a protective device of the energy storage arrangement according to the first exemplary embodiment.
Figure 3:
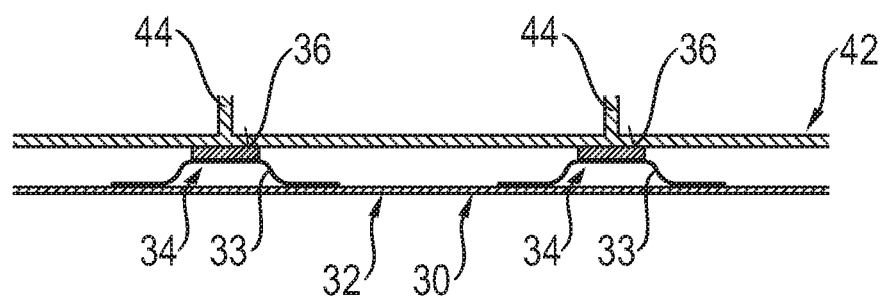
FIG. 3 shows a further sectional view of the energy storage arrangement according to the application according to the first exemplary embodiment.

The load introduction elements 34 of the energy storage arrangement 20 according to the first exemplary embodiment are in the form of such a top hat profile 33. This configuration is illustrated in particular in FIGS. 1 to 3.

The load introduction elements 34 of the energy storage arrangement 20 according to the third exemplary embodiment are in the form of domes 35 which are injection molded on the protective plate 32 in an in-situ process.

The motor vehicle according to the application comprises an energy storage arrangement 20 according to the application, wherein the protective device 30 of the energy storage arrangement 20 is arranged above a ground clearance line of the motor vehicle, wherein the at least one battery module is arranged above the protective device 30, and wherein the battery module housing 42 of the battery module is arranged on the motor vehicle in such a manner that the at least two housing walls 44 of the battery module housing 42 are arranged vertically.

The impact behavior of the motor vehicle can be improved by means of the energy storage arrangement 20 according to the application. Furthermore, the energy storage arrangement according to the application has a reduced construction space requirement. Furthermore, a center of gravity of the motor vehicle can be lowered in a simple manner with the energy storage arrangement 20 according to the application. As a result, a roof line of the motor vehicle can furthermore likewise be lowered.

What is claimed:

1. An energy storage arrangement for a motor vehicle, said energy storage arrangement comprising:
    a protective device which is configured to be arranged above a ground clearance line of the motor vehicle, and
    at least one battery module which is arranged above the protective device, and which has a battery module housing and at least one battery cell pack arranged in an interior of the battery module housing,
    wherein the battery module housing comprises at least three vertically arranged housing walls, wherein at least one of the housing walls is in the form of a partition which divides the battery module housing into at least two chambers, in each of which a battery cell pack is arranged, and
    wherein the protective device comprises a protective plate and at least three load introduction elements arranged above the protective plate and below the at least three housing walls, respectively.

2. The energy storage arrangement as claimed in claim 1, wherein the battery module housing is an extruded profile.

3. The energy storage arrangement as claimed in claim 1, wherein the load introduction elements comprise at least one supporting surface which is arranged below one of the housing walls.

4. The energy storage arrangement as claimed in claim 1, wherein the load introduction elements are substantially wave-shaped and form a corrugated plate.

5. The energy storage arrangement as claimed in claim 1, wherein the load introduction elements have a top hat profile.

6. The energy storage arrangement as claimed in claim 1, wherein the load introduction elements are in the form of domes which are injection molded on the protective plate in an in-situ process.

7. A motor vehicle comprising the energy storage arrangement as claimed in claim 1, wherein the protective device of the energy storage arrangement is arranged above the ground clearance line of the motor vehicle, wherein the at least one battery module is arranged above the protective device, and wherein the battery module housing of the at least one battery module is arranged on the motor vehicle in such a manner that the at least three housing walls of the battery module housing are arranged vertically.

8. The energy storage arrangement as claimed in claim 1, wherein the battery module housing is a monolithic and extruded profile including each of the at least three vertically arranged housing walls.

9. The energy storage arrangement as claimed in claim 1, wherein one face of said at least one of the housing walls delimits one chamber of said at least two chambers, and an opposite face of said at least one of the housing walls delimits another chamber of said at least two chambers.

10. The energy storage arrangement as claimed in claim 1, wherein the battery module housing comprises a lower wall that interconnects all of the at least three vertically arranged housing walls.

11. The energy storage arrangement as claimed in claim 1, wherein one of the vertically arranged housing walls is spaced apart from a vertically arranged housing wall of a second battery module housing by an air gap.

12. The energy storage arrangement as claimed in claim 1, wherein each of the at least three load introduction elements comprises (i) a horizontal supporting surface, (ii) two horizontal mounting surfaces that are mounted to the protective plate, (iii) a first leg extending at an acute angle between one end of the horizontal supporting surface and one of the two horizontal mounting surfaces, and (iv) a second leg extending at an acute angle between the other end of the horizontal supporting surface and the other of the two horizontal mounting surfaces, wherein the first and second legs are configured to deform under an applied vertical load in a space between said one of the housing walls and the protective plate.

* * * * *